US012169278B2

(12) United States Patent
Qin et al.

(10) Patent No.: US 12,169,278 B2
(45) Date of Patent: Dec. 17, 2024

(54) HEAD MOUNTED DISPLAY WITH MULTIFOCAL MODULE

(71) Applicant: GOOGLE LLC, Mountain View, CA (US)

(72) Inventors: Yi Qin, Mountain View, CA (US); Ozan Cakmakci, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 627 days.

(21) Appl. No.: 17/437,174

(22) PCT Filed: Dec. 4, 2019

(86) PCT No.: PCT/US2019/064409
§ 371 (c)(1),
(2) Date: Sep. 8, 2021

(87) PCT Pub. No.: WO2020/256770
PCT Pub. Date: Dec. 24, 2020

(65) Prior Publication Data
US 2022/0171192 A1 Jun. 2, 2022

Related U.S. Application Data

(60) Provisional application No. 62/863,552, filed on Jun. 19, 2019.

(51) Int. Cl.
G02B 27/01 (2006.01)
(52) U.S. Cl.
CPC .. G02B 27/0172 (2013.01); *G02B 2027/0185* (2013.01)

(58) Field of Classification Search
CPC .. G02B 27/01; G02B 27/017; G02B 27/0172; G02B 27/0163; G02B 27/0178;
(Continued)

(56) References Cited

U.S. PATENT DOCUMENTS 4,900,133 A * 2/1990 Berman ............. G02B 27/0101
349/194
8,687,149 B2 4/2014 Bell et al.
(Continued)

FOREIGN PATENT DOCUMENTS

EP 3404475 A1 11/2018

OTHER PUBLICATIONS

International Search Report and Written Opinion mailed Mar. 10, 2020 for corresponding International Application No. PCT/US2019/064409, 12 pages.
(Continued)

*Primary Examiner* — Sultan Chowdhury

(57) ABSTRACT

An HMD employs a multifocal module having one or more voltage controlled optical elements. By changing the voltage applied to the one or more optical elements, the HMD can change the focal length of an image generated by the micro-display. The multifocal module can include a cholesteric liquid crystal (CLC) element and a polarizer switch. By controlling the voltage applied to each of the CLC element and the polarizer switch, the HMD can change the focal length of the image passed through the multifocal module. The HMD can thereby change the focal length of any image generated by the micro-display.

17 Claims, 6 Drawing Sheets

(58) Field of Classification Search
CPC .... G02B 2027/0132; G02B 2027/0127; G02B 2027/0178; G02B 2027/0185; G02B 7/00; G02B 7/06; G02B 7/002; G02B 7/04; G02B 7/003
See application file for complete search history.

(56) References Cited

U.S. PATENT DOCUMENTS

| | | | |
|---|---|---|---|
| 9,507,066 B2 | 11/2016 | Kollin et al. | |
| 9,671,612 B2 | 6/2017 | Kress et al. | |
| 9,709,829 B2 | 7/2017 | McGrew | |
| 9,927,614 B2 | 3/2018 | Vallius | |
| 9,946,070 B2 | 4/2018 | Tam et al. | |
| 9,964,769 B2* | 5/2018 | Martinez | G02B 25/001 |
| 11,237,396 B2 | 2/2022 | Heugten | |
| 11,474,355 B2 | 10/2022 | Gao et al. | |
| 2005/0122454 A1* | 6/2005 | Sharp | G02B 27/288 348/E9.027 |
| 2014/0354996 A1* | 12/2014 | Fontecchio | G03F 7/26 349/86 |
| 2015/0378074 A1 | 12/2015 | Kollin et al. | |
| 2017/0115487 A1* | 4/2017 | Travis | G03H 1/0256 |
| 2017/0160518 A1 | 6/2017 | Lanman et al. | |
| 2018/0048881 A1* | 2/2018 | Eash | G02B 7/06 |
| 2018/0239146 A1 | 8/2018 | Bierhuizen et al. | |
| 2018/0284464 A1 | 10/2018 | Lu et al. | |
| 2020/0049992 A1* | 2/2020 | Peng | G06F 3/012 |
| 2020/0081315 A1* | 3/2020 | Jamali | G02B 5/30 |

OTHER PUBLICATIONS

Communication pursuant to Article 94(3) EPC mailed Jan. 15, 2024 for EP Application No. 19828079.4, 6 pages.
Translation of Chinese Office Action mailed Feb. 14, 2023 for CN Application No. 201980094974.1 (G19004-CN), 18 pages.
International Preliminary Report on Patentability mailed Dec. 30, 2021 for International Application No. PCT/US2019/064409, 8 pages.
Translation of Second Chinese Office Action mailed Jul. 26, 2023 for CN Application No. 201980094974.1, 23 pages.
Translation of Third Chinese Office Action mailed Nov. 29, 2023 for CN Application No. 201980094974. 1, 16 pages.

* cited by examiner

HEAD MOUNTED DISPLAY WITH MULTIFOCAL MODULE

CROSS-REFERENCE TO RELATED APPLICATIONS

The present application is a U.S. National Stage under 35 U.S.C. § 371 of International Patent Application Serial No. PCT/US2019/064409, entitled "HEAD MOUNTED DISPLAY WITH MULTIFOCAL MODULE" and filed on 4 Dec. 2019, which claims priority to U.S. Provisional Application No. 62/863,552, entitled "HEAD MOUNTED DISPLAY WITH MULTIFOCAL MODULE" and filed on 16 Jun. 2019, the entireties of which are incorporated by reference herein.

BACKGROUND

Head mounted display (HMD) systems provide a way to visually immerse a user in a virtual reality (VR) or augmented reality (AR) environment, or to display other content to a user in a convenient way. Some HMD systems include a micro-display that emits an image via a set of light rays. The light rays are coupled into a lightguide of the HMD and bounce repeatedly from a world side surface of the lightguide before entering the eye of the user. However, conventional HMD systems have limitations that can negatively impact the viewer experience. For example, some HMD systems can only display images having a single focal plane, limiting the immersiveness and flexibility of the displayed images. Other HMD systems include mechanisms to generate images at different focal planes, such as multiple micro-displays, mechanisms to mechanically adjust portions of the HMD, and the like, but these systems have other limitations, including large form factors and high cost.

SUMMARY

The present disclosure relates to systems and techniques for providing images of different focal lengths from a single micro-display of an HMD by employing a multifocal module having one or more voltage controlled optical elements. By changing the voltage applied to the one or more optical elements, the HMD can change the focal length of an image generated by the micro-display. For example, the multifocal module can a cholesteric liquid crystal (CLC) element and a polarizer switch. By controlling the voltage applied to each of the CLC element and the polarizer switch, the HMD can change the focal length of the image passed through the multifocal module. The HMD can thereby change the focal length of any image generated by the micro-display.

The images fields of different focal lengths can be employed to support a variety of uses and applications. For example, in some embodiments, the images of different focal lengths can be used to display objects at different image planes, increasing the immersiveness of VR and AR content. Further, the multifocal module can be constructed of optical elements, such as the CLC element, having a small form factor, thereby allowing the multifocal to be used in a variety of HMD systems.

According to one aspect, a head mounted display system is proposed comprising a micro-display to emit display light; and a multifocal module coupled to the micro-display and comprising a voltage controlled optical element, the multifocal module to generate a plurality of images based on the display light, each of the plurality of images having a different focal length. The multifocal module may be thus be configured to generate an image based on the display light, wherein a focal length of the generated image and thus an imagine plane of the generated image may be based on a voltage applied to the multifocal module.

In an exemplary embodiment, the multifocal module may comprise a voltage-controlled cholesteric liquid crystal (CLC) element. A voltage-controlled polarizer switch may be coupled to the CLC element. The multifocal module can include a cholesteric liquid crystal (CLC) element and a polarizer switch. By controlling the voltage applied to each of the CLC element and the polarizer switch, the HMD can change the focal length of the image passed through the multifocal module. The HMD can thereby change the focal length of any image generated by the micro-display.

For example, the polarizer may, optionally, be a liquid crystal display (LCD) cell. Additionally or alternatively, the multifocal module may comprise a plane parallel plate coupled to the polarizer switch.

In an exemplary embodiment, the multifocal module may comprise at least one of a liquid crystal (LC) phase shifter, a liquid crystal combiner and a filter stack coupled to the multifocal module. In an embodiment, the filter stack may comprise a first quarter waveplate to which a beamsplitter is coupled. To the beamsplitter a second quarter waveplate may be coupled.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate systems and techniques for providing images of different focal lengths from a single micro-display of an HMD by employing a multifocal module having one or more voltage controlled optical elements.

Figure 1:
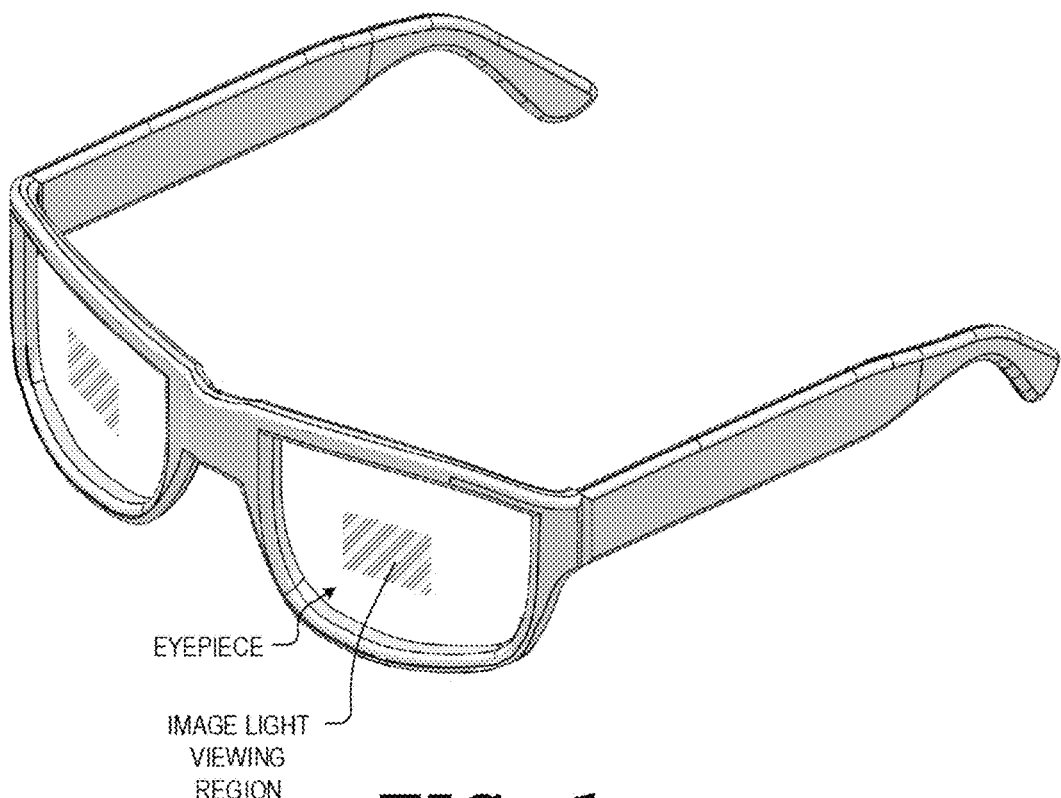
FIG. 1 is a diagram of an HMD system including a multifocal module with at least one voltage controlled optical element to generate images having different focal lengths from a common micro-display in accordance with some embodiments.

FIG. 1 illustrates an HMD 100 in accordance with some embodiments. In the depicted example the HMD 100 has an eyeglass form factor and includes two see-through eyepieces 102 and 103 that each provide image light to a user in a viewing region (e.g. viewing region 104) along with a view of the surrounding environment. The image light may be augmented reality data that provides information of one or more objects in the surrounding environment. Additionally, the image light provides other information to the user such as text messages, email messages, phone call information, etc.

The HMD 100 includes electronics and a micro-display (not shown at FIG. 1) to project the image light to the user. The electronics are either coupled to a secondary electronics device, such as a computer or cell phone, that provides the data for generating the image light, or the electronics include wireless communication technology that allows for the receipt of the information via a wireless network, such as Bluetooth, Wi-Fi or cellular. In some embodiments, each eyepiece includes a lightguide or other element that provides an optical pathway for the image light to propagate from a micro-display to the image light viewing region 104, which is arranged to be aligned with the user's eye. The lightguide relies on total internal reflection (TIR) for propagating the image light from an input coupler to an output coupler, which redirects the light out of the HMD 100 and toward the eye of the user in the image light viewing region. The eyepieces may additionally include vision correction lensing for the user or absorbing sunglass coatings.

As described further below, between the micro-display and the optical pathway the HMD 100 can include a multifocal module that can change the focal length of an image generated at the micro-display. The multifocal module includes one or more voltage controlled optical elements. By changing the voltage applied to the optical elements (e.g., by changing states of a CLC element), the HMD changes the focal length of the image.

Figure 2:
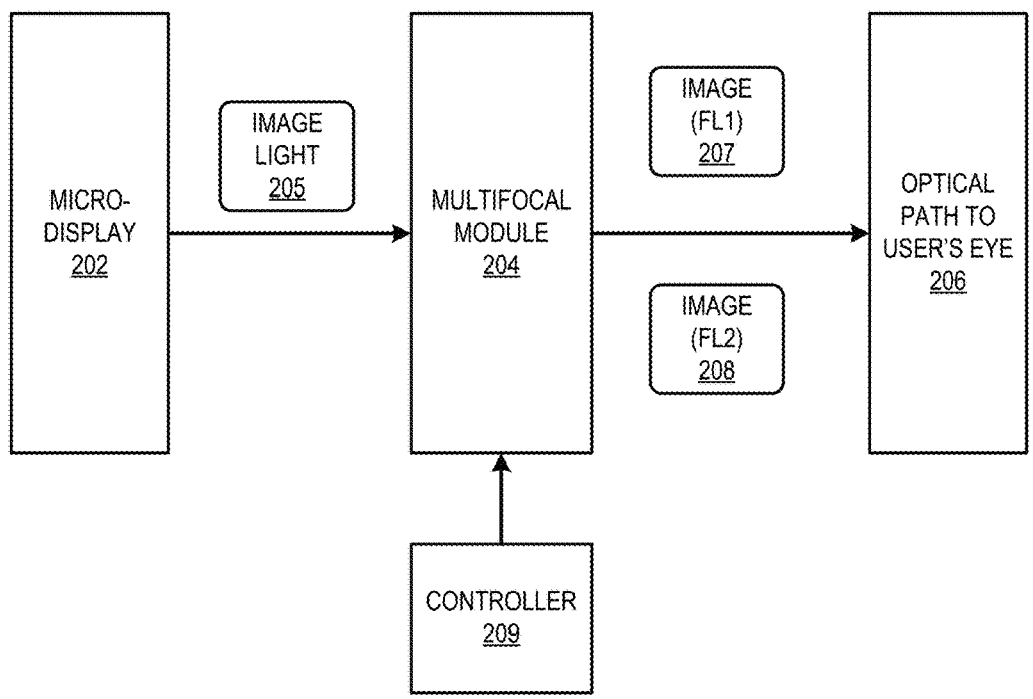
FIG. 2 is a block diagram illustrating a portion of the HMD of FIG. 1 including the multifocal module in accordance with some embodiments.

FIG. 2 illustrates a block diagram of portions of the HMD 100 in accordance with some embodiments. In the depicted example, the HMD 100 includes a micro-display 202, a multifocal module 204, an optical path 206 and a controller 209. The micro-display is generally configured to generate image light 205 based on image frames received from a graphics processing unit (GPU) or other image frame generator (not shown). The optical path 206 includes one or more optical elements, such as a lightguide, to propagate image light generated by the multifocal module 204 to a user's eye.

The multifocal module 204 includes one or more voltage controlled optical elements that can set the focal length of images based on the image light 205, as described further herein. For example, in some embodiments the multifocal module 204 includes a CLC element and a polarizer switch, each controllable by an associated control signal generated by the controller 209. Depending on the state of the control signal, the optical path through optical elements of the multifocal module is changed, as described further below, thereby changing the focal length of the image associated with the image light 205. In other embodiments the multifocal module 204 includes a voltage-controlled phase modulator. The controller 209 can generate the voltage to control the phase modulator to change the focal length of the image associated with the image light 205 as described further below. Thus, the multifocal module 204 is configured to generate light representing images (e.g. image 207 and image 208) wherein the focal length associated with each image is based on the control signal(s) generated by the controller 209. Thus, for example, the images 207 and 208 have different focal lengths (designated FL1 and FL2), based on the control signals generated by the controller 209.

Figure 3:
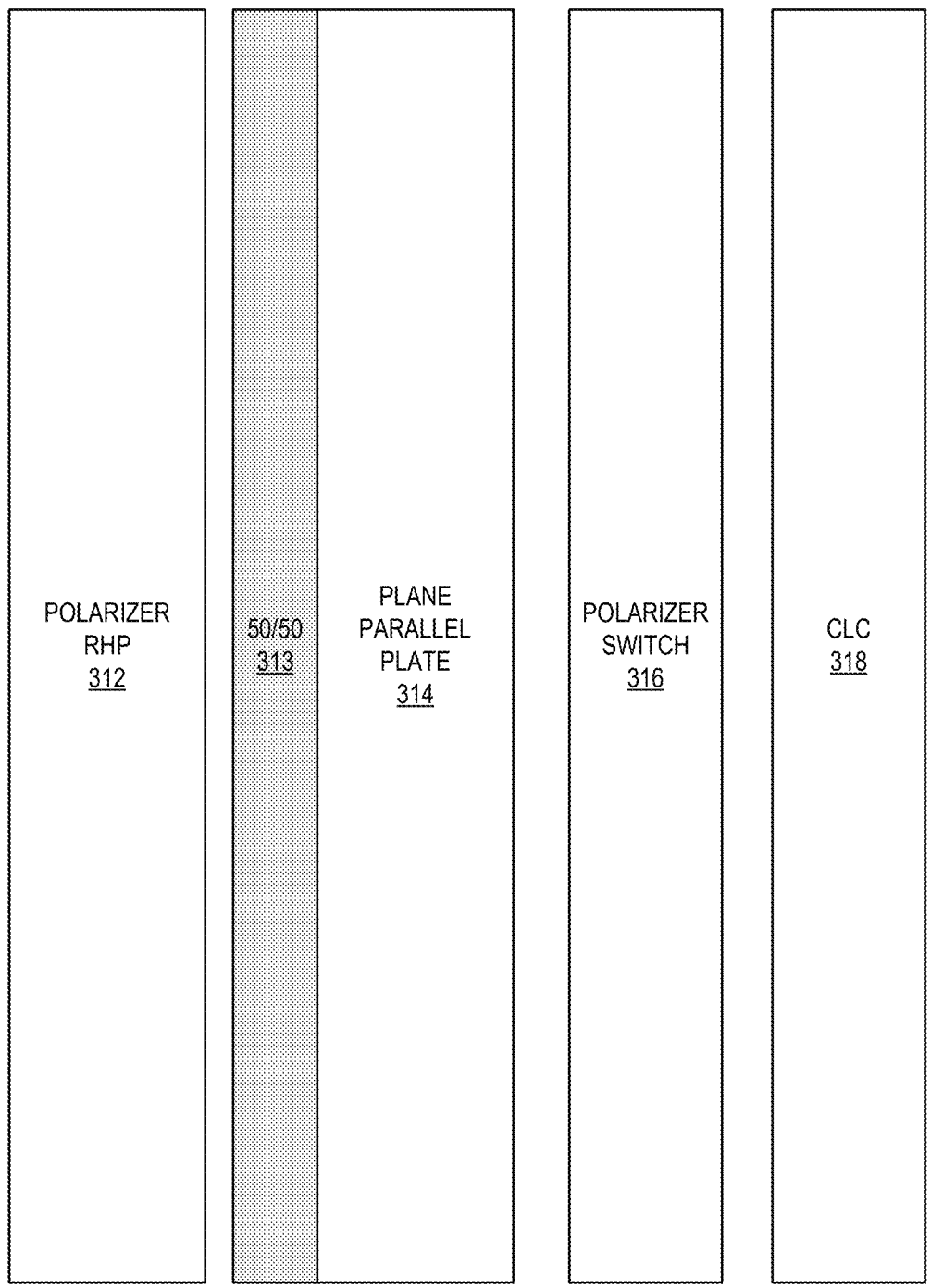
FIG. 3 is a diagram illustrating a multifocal module having a cholesteric liquid crystal element in accordance with some embodiments.

FIG. 3 illustrates a block diagram of the multifocal module 204 in accordance with some embodiments. In the depicted example, the multifocal module 204 includes a right-handed polarizer 312, a plane-parallel plate 314 having a 50/50 beamsplitting coating 313, a polarizer switch 316 and a cholesteric liquid crystal (CLC) element 318. The right-handed polarizer 312 and the plane parallel plate 314 together pass right-handed circularly polarized light based on the image light 205. The polarizer switch 316 is generally configured to pass light of a specified polarization based on the state of a received control signal (not shown). Thus, for example, in response to the control signal having a first state, the polarizer switch 316 passes right-hand (R)-polarized light and in response to the control signal having a second state, the polarizer switch 316 switches the R-polarized light to left-hand (L)-polarized light. In some embodiments, the polarizer switch 316 is a liquid crystal display (LCD) cell and the control signal is a voltage provided by the controller 209.

The CLC element 318 is an element that, depending on an applied voltage, is transparent to or reflects light of a specified polarization. When there is no voltage applied to the CLC element 318, the liquid crystal molecules have a helical structure with a pitch that results in a Bragg reflection. When the incident unpolarized light hits the cholesteric liquid crystal (left-handed), the left-handed circularly polarized light will be reflected. When the CLC element 318 is switched by an electric field, the CLC molecules are unwound such that all the molecules are aligned along the electric field. Thus, the helical structure disappears so does the Bragg reflection. Therefore, they become transparent to any polarization light.

In operation, the controller 209 controls the voltages applied to the polarizer switch 316 and the CLC element 318 to alternately change the optical path for the image light 205 through the elements of the multifocal module 204. In particular, the controller 209 alternates a relatively short optical path with a relatively long optical path, thereby changing the focal length associated with the image light. This can be better understood with reference to FIG. 4.

Figure 4:
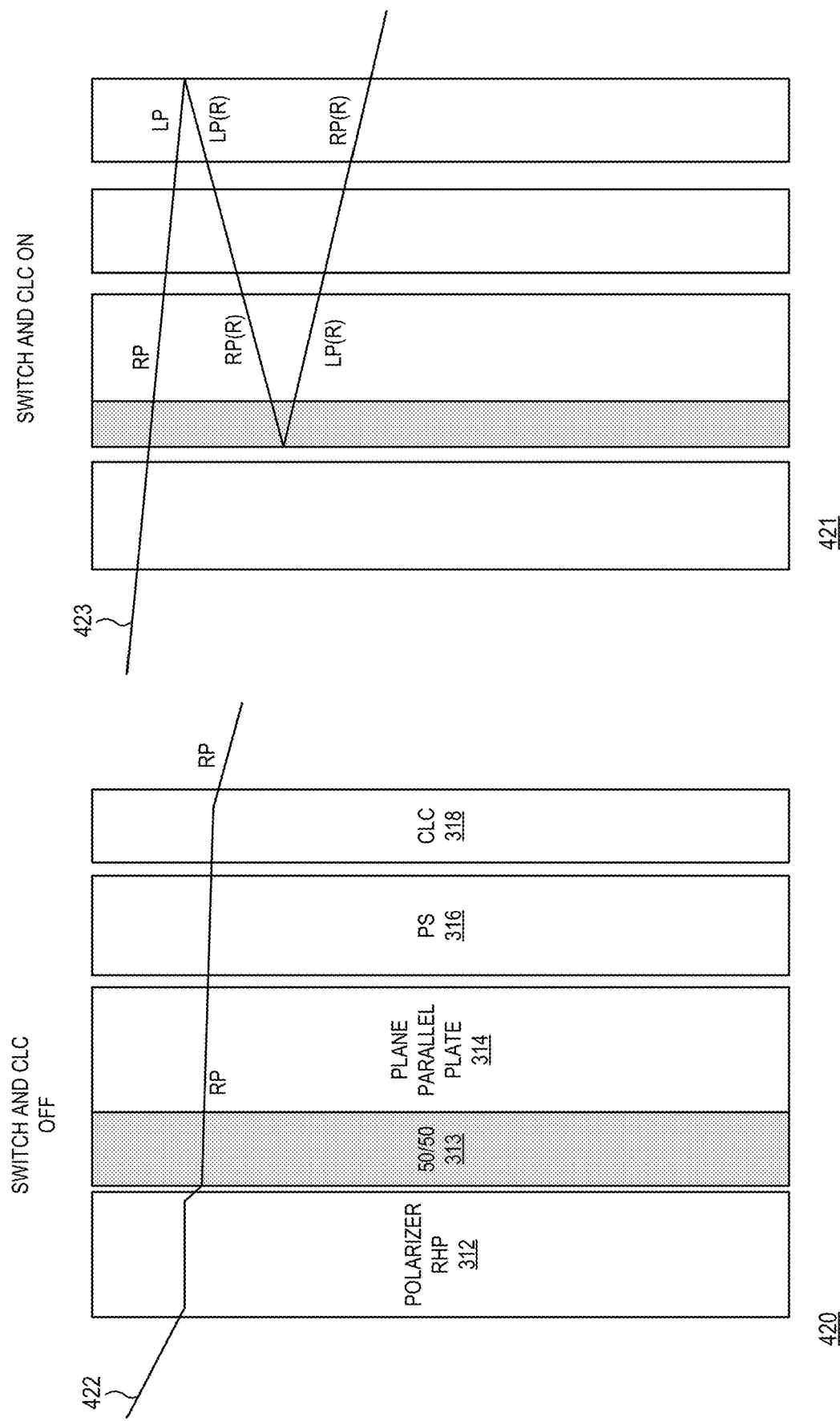
FIG. 4 is a diagram illustrating operation of the multifocal module of FIG. 3 in accordance with some embodiments.

FIG. 4 illustrates two different states of the multifocal module 204 in accordance with some embodiments, designated states 420 and 421. The state 420 represents the state when the controller 209 has applied control signals (voltages) to place the polarizer switch 316 and the CLC element 318 in "off" states. Accordingly, in state 421 the polarizer switch passes R-polarized light without changing the light's polarization, and the CLC element 318 passes all polarized light. Thus, in the illustrated example, an unpolarized light ray 422 is converted to R-polarized light, and that light is passed through the remaining optical elements.

The state 421 represents the state when the controller 209 has applied control signals to place the polarizer switch 316 and the CLC element 318 in "on" states. Thus, in state 421 the polarizer switch 316 converts R-polarized light to L-polarized light and R-polarized light to L-polarized light and the CLC element 318 reflects L-polarized light and passes R-polarized light. The path of light through the optical elements of the multifocal module 204 in state 412 is illustrated by a ray 423. In the depicted example, R-polarized light is designated with the label "R" and L-polarized light is designated with the label "L".

As shown, the ray 423 first passes through the polarizer 312, and thus becomes R-polarized light. Because the polarizer switch 316 is in the on state, the ray 423 is converted from R-polarized to L-polarized light and, because the CLC element 318 is in the on state, the L-polarized light is reflected. Accordingly, the ray 423 passes back through the polarizer switch 316 and is converted to R-polarized light.

The ray 423 then passes through the plane parallel plate 314, which reflects the ray 423 as L-polarized light. The ray 423 is then converted to R-polarized light by the polarizer switch 316, and the R-polarized light is passed by the CLC element 318.

As is understood in the art, the focal lengths associated with the rays 423 and 423 at the output of the multifocal module 204, after the rays 423 and 423 pass through the CLC element 318, is governed in part by the thickness of the optical elements through which each ray passes. By increasing the length of the optical path for the ray 423, relative to the ray 423, the multifocal module changes the focal length of the ray 423 as compared to the ray 423. Thus, by alternating the states 420 and 421 (by alternating the voltages applied to the polarizer switch 316 and CLC element 318, the controller 209 can change the focal length associated with images generated from image light 205.

Figure 5:
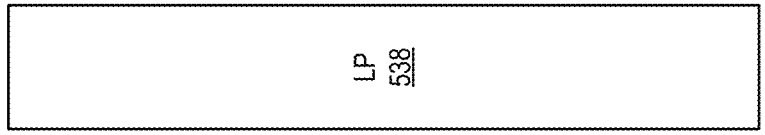
FIG. 5 is a diagram illustrating the multifocal module of FIG. 3 in conjunction with additional optical elements in accordance with some embodiments.
Figure 5:
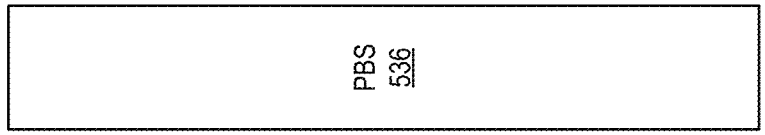
Figure 5:
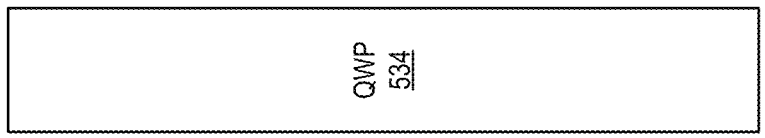
Figure 5:
Figure 5:
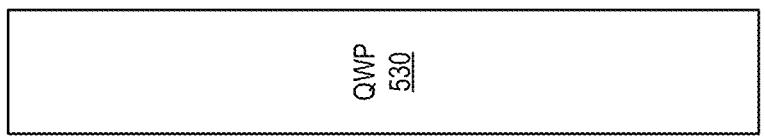
Figure 5:
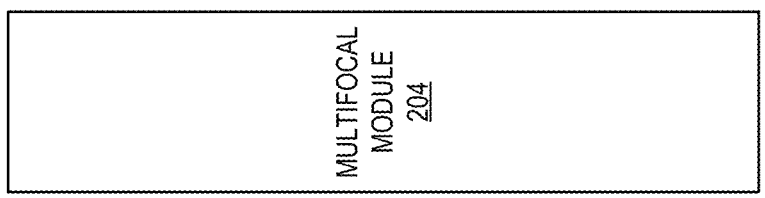
Figure 5:
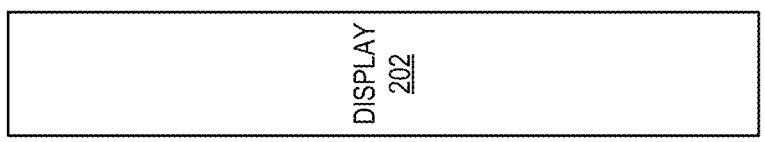

In some embodiments, the multifocal module 204 is coupled to additional optical elements that form at least a portion of the optical path 206 to direct light to a user's eye. These additional optical elements can also change the focal length and image plane associated with each image provided by the multifocal module 204 in order to present a satisfactory visual experience to a user. An example of these optical elements is illustrated at FIG. 5 in accordance with some embodiments. In the depicted example, the multifocal module 204 is disposed between the micro-display 202 and a filter stack formed by a quarter waveplate 530, a beamsplitter 532, a quarter waveplate 534, a polarization beamsplitter 536, and a linear polarizer 538.

In operation, the multifocal module 204 generates, based on image light provided by the micro-display 202, images of different focal length. The light of the images generated by the multifocal module 204 is then passed through the filter stack and directed to the user's eye. In particular, the light is passed through the quarter waveplate 530 which generates L-polarized light. The L-polarized light is then passed through the beamsplitter 532, and is translated to linearly polarized light (with polarization designated as x-polarization) by the quarter waveplate 534. The x-polarized light is reflected by the polarization beamsplitter 536. The reflected x-polarized light is translated to L-polarized light by the quarter waveplate 534. This reflected L-polarized light is then reflected again as R-polarized light by the beamsplitter 532. The R-polarized light is translated to linearly polarized light, with polarization designated as y-polarization that is orthogonal to x-polarization. The y-polarized light passes through the polarization beamsplitter 536 and the linear polarizer 538 and is directed towards the user's eye.

The filter stack illustrated at FIG. 5 can be manufactured with relatively small optical elements, such that the overall form factor of the filter stack, together with the multifocal module, is also small. The small form factor allows the depicted embodiment to be comfortably placed in a variety of HMD form factors while generating images associated with different focal lengths, and therefore having different image planes, and enhancing the overall user experience.

Figure 6:
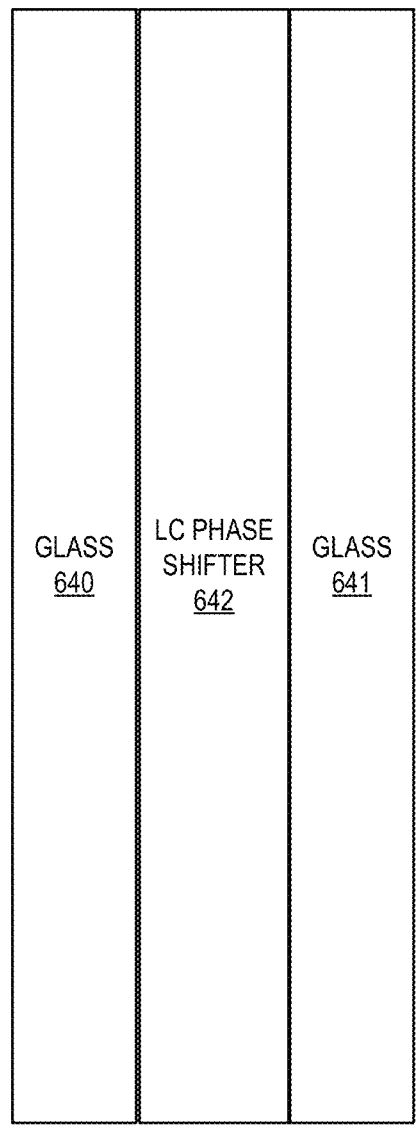
FIG. 6 is a diagram illustrating a multifocal module having a liquid crystal phase shifter in accordance with some embodiments.

FIG. 6 illustrates another embodiment of the multifocal module 204. In the illustrated embodiment, the multifocal module 204 is a plane parallel plate having a liquid crystal (LC) phase shifter 642 disposed between two plates of glass 640 and 641. The LC phase shifter 642 has one or more liquid crystal layers disposed such that, when a voltage is applied across the layers, the refractive index of the layers change. Thus, the refractive index of the LC phase shifter 642 is controlled by a voltage supplied by a controller, such as controller 209 (FIG. 2). Further, the focal plane of the light passing through the LC phase shifter 642 depends on the refractive index of the liquid crystal layers. Thus, by changing the voltage applied to the LC phase shifter 642, the controller 209 can change the focal plane of the light at the output of the multifocal module 204, thereby generating images with different image planes. For example, in some embodiments the controller 209 alternates the voltage applied to the LC phase shifter 642 between a first voltage and a different second voltage, thereby generating images having two different image planes based on the same micro-display 202. In some embodiments, the LC phase shifter 642 is used as the multifocal module in the embodiment of FIG. 5, with the illustrated filter stack.

In other embodiments, the multifocal module is a liquid crystal combiner that combines display light with incident light for display to a user. The reflective freeform liquid crystal (LC) optical element reflects incident light as well as converts incident plane wave to an arbitrary wavefront by applying a voltage. The LC optical element can be flat one or curved one depending on substrates. When a voltage is applied to the LC element, the orientations of LC molecules are manipulated by applied electric fields and then the incident light travels at different speed as light propagates through the LC optical element. The wavefront modulation results from the variation of light speed as a light propagates through the LC molecules. Particular wavefronts can be achieved by applying a distribution of applied electric fields. Such wavefronts change with applied electric field to the LC optical element. The LC optical elements can be designed as an optically isotropic one or anisotropic one.

Figure 7:
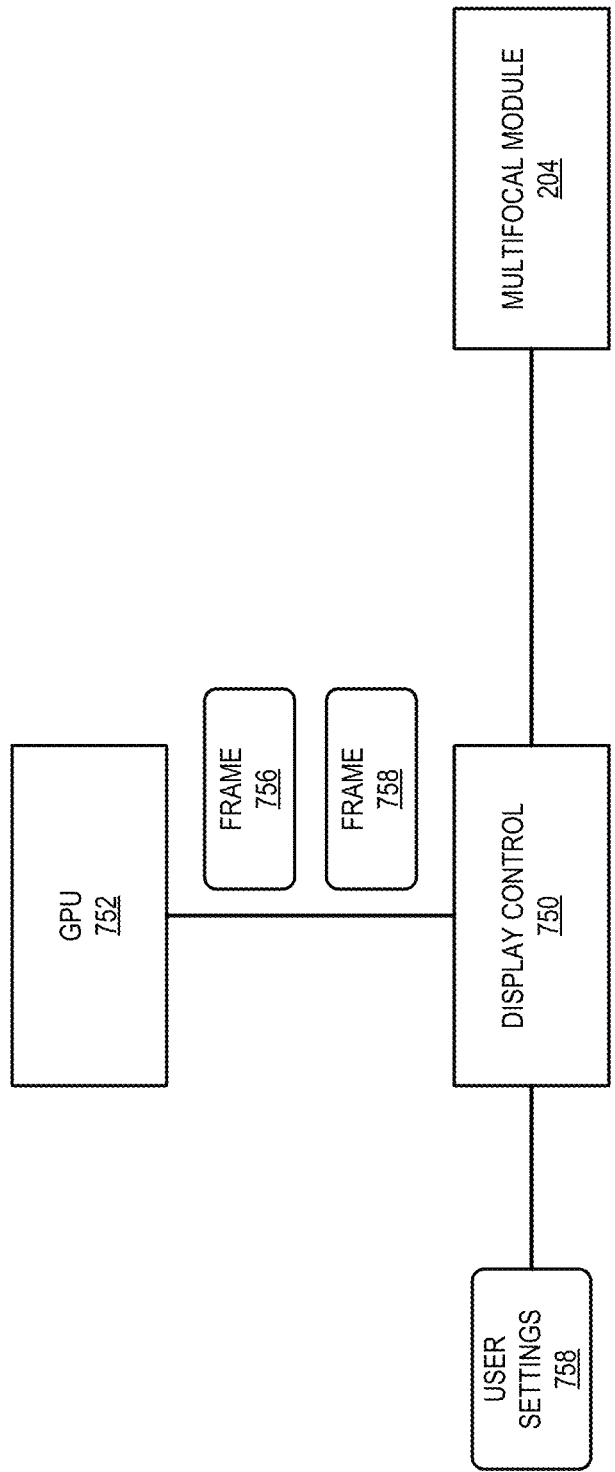
FIG. 7 is a block diagram of the HMD of FIG. 1 including a display system to display content via multiple fields of view in accordance with some embodiments.

FIG. 7 illustrates a block diagram of the HMD 100 of FIG. 1 including a display system to display content via multiple image planes in accordance with some embodiments. To support display of images with different image planes, the HMD 100 includes a display control module 750, a graphics processing unit (GPU) 752, and the multifocal module. The GPU 752 is generally configured to generate frames (e.g., frames 756 and 757) for display at the HMD 100 based on commands received from another processor (not shown) such as a central processing unit (CPU) of an external device (e.g. a computer or cell phone) or a CPU of the HMD 100. The display control module 750 is generally configured to control operation of the multifocal module 204 to time multiplex the provision of light of different focal lengths to the user. In some embodiments, the display control module 750 controls provision of the frames from the GPU 752 to the micro-display 202 and synchronizes provision and display of the frames at the micro-display 202 with control of the multifocal module 204 so that different frames are associated with different focal planes, and are displayed with different image planes.

By displaying different frames via different image planes, the HMD 100 supports flexible and immersive display of information to the user. For example, in some embodiments the display control module 750 selects the frame to display via at a particular image plane to create an overall image that appears to the user to have depth, creating a more immersive VR or AR environment. In some embodiments, the image planes for the different frames are based on a set of user settings 758. The user can adjust the user settings 758 (via, e.g., a graphical user interface (GUI) or other interface so that the display control module displays frames associated with different applications, or different types of information, at different image planes. For example, in some embodiments the user can adjust the user settings 758 so that a video is displayed at one image plane and notification information (e.g. email or chat notifications) are displayed via a different image plane.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display (HMD) system comprising:
   a micro-display to emit display light;
   a multifocal module coupled to the micro-display and comprising a voltage controlled optical element, the multifocal module to generate a plurality of images based on the display light, each of the plurality of images having a different focal length; and
   a filter stack coupled to the multifocal module.

2. The HMD system of claim 1, wherein the multifocal module comprises:
   a voltage-controlled cholesteric liquid crystal (CLC) element.

3. The HMD system of claim 2, wherein the multifocal module comprises:
   a voltage-controlled polarizer switch coupled to the CLC element.

4. The HMD system of claim 3, wherein the voltage-controlled polarizer switch is a liquid crystal display (LCD) cell.

5. The HMD system of claim 3, wherein the multifocal module comprises:
   a plane parallel plate coupled to the voltage-controlled polarizer switch.

6. The HMD system of claim 1, wherein the multifocal module comprises:
   a liquid crystal (LC) phase shifter.

7. The HMD system of claim 1, wherein the filter stack comprises:
   a first quarter waveplate;
   a beamsplitter coupled to the first quarter waveplate; and
   a second quarter waveplate coupled to the beamsplitter.

8. A display system comprising:
   a micro-display to emit display light;
   a controller to control at least one voltage;
   a multifocal module coupled to the controller and comprising an optical element to generate images of different image planes based on the at least one voltage; and
   a filter stack coupled to the multifocal module.

9. The display system of claim 8, wherein the multifocal module comprises:
   a voltage-controlled cholesteric liquid crystal (CLC) element.

10. The display system of claim 9, wherein the multifocal module comprises:
    a voltage-controlled polarizer switch coupled to the CLC element.

11. The display system of claim 10, wherein the voltage-controlled polarizer switch is a liquid crystal display (LCD) cell.

12. The display system of claim 11, wherein the multifocal module comprises:
    a plane parallel plate coupled to the voltage-controlled polarizer switch.

13. The display system of claim 8, wherein the multifocal module comprises:
    a liquid crystal (LC) phase shifter.

14. A method, comprising:
generating display light at a micro-display; and
controlling a voltage applied to a multifocal module to generate a plurality of images based on the display light, each of the plurality of images having a different focal length based on the voltage; and
receiving, by a filter stack coupled to the multifocal module, the plurality of images from the multifocal module.

15. The method of claim 14, wherein the multifocal module comprises:
a voltage-controlled cholesteric liquid crystal (CLC) element.

16. The method of claim 14, wherein the multifocal module comprises:
a liquid crystal (LC) phase shifter.

17. A head mounted display (HMD) system comprising:
a micro-display to emit display light; and
a multifocal module coupled to the micro-display, wherein the multifocal module comprises a voltage-controlled polarizer switch coupled to a cholesteric liquid crystal element and wherein the multifocal module is configured to generate a plurality of images each having a different focal length based on the display light.

* * * * *